US012806917B2

(12) United States Patent
(10) Patent No.: US 12,806,917 B2
(45) Date of Patent: Nov. 24, 2026

Pujiatno

(54) PRINTING APPARATUS AND METHOD FOR CONTROLLING PRINTING APPARATUS

(71) Applicant: SEIKO EPSON CORPORATION, Tokyo (JP)

(72) Inventor: Pujiatno, Bekasi (ID)

(73) Assignee: Seiko Epson Corporation, Tokyo (JP)

( * ) Notice: Subject to any disclaimer, the term of this patent is extended or adjusted under 35 U.S.C. 154(b) by 162 days.

(21) Appl. No.: 18/604,073

(22) Filed: Mar. 13, 2024

(65) Prior Publication Data

US 2024/0308235 A1 Sep. 19, 2024

(30) Foreign Application Priority Data

Mar. 14, 2023 (JP) ................................ 2023-039862

(51) Int. Cl.
*B41J 2/21* (2006.01)
*B41J 2/165* (2006.01)

(52) U.S. Cl.
CPC ......... *B41J 2/2135* (2013.01); *B41J 2/16517* (2013.01); *B41J 2/2142* (2013.01)

(58) Field of Classification Search
CPC .... B41J 2/2135; B41J 2/16517; B41J 2/2142; B41J 2002/16573; B41J 2/16579
See application file for complete search history.

(56) References Cited

U.S. PATENT DOCUMENTS

2002/0130918 A1* 9/2002 Hayakawa ........... B41J 2/16532 347/29
2017/0165991 A1* 6/2017 Kurasawa .............. B41J 29/393
2021/0086517 A1* 3/2021 Nakano .................. B41J 2/0451

FOREIGN PATENT DOCUMENTS

JP 2020-163596 A 10/2020

* cited by examiner

*Primary Examiner* — Jannelle M Lebron
(74) *Attorney, Agent, or Firm* — WORKMAN NYDEGGER

(57) ABSTRACT

A printing apparatus includes: a printing head including a plurality of nozzles; a control unit configured to control ejection of the ink by the printing head; a display unit; an operation reception unit configured to receive an operation from outside; and a cleaning unit configured to execute cleaning of the printing head, in which the control unit causes the printing head to eject the ink from the plurality of nozzles to a medium, thereby causing the printing head to print a test pattern, causes the display unit to display the plurality of test pattern images that are test pattern images obtained by simulating a printing result of the test pattern and whose printing defectiveness degrees are different as a plurality of options, receives selection of the test pattern image through the operation reception unit, and causes the cleaning unit to execute cleaning corresponding to the selected test pattern image among the plurality of types of cleaning associated with the plurality of test pattern images in advance.

6 Claims, 10 Drawing Sheets

PRINTING APPARATUS AND METHOD FOR CONTROLLING PRINTING APPARATUS

The present application is based on, and claims priority from JP Application Serial Number 2023-039862, filed Mar. 14, 2023, the disclosure of which is hereby incorporated by reference herein in its entirety.

BACKGROUND

1. Technical Field

The present disclosure relates to a printing apparatus that executes cleaning of a printing head, and a method for controlling the printing apparatus.

2. Related Art

In a printer that performs printing by using a printing head including a plurality of nozzles that can eject an ink, a nozzle may be clogged due to thickening of the ink, adhesion of dust, or the like, and dot missing may occur. The dot missing refers to a state where a dot that should originally be present in a printing result is missing. Therefore, a printer executes cleaning for eliminating clogging of the nozzle to improve printing defectiveness.

A printer is disclosed in which options such as "low", "normal", and "high" are described using characters as intensity of head cleaning and are displayed on a display panel, and the intensity of the head cleaning is selected by a user (see JP-A-2020-163596).

JP-A-2020-163596 is an example of the related art.

However, it cannot be said that optimum presentation is currently performed for the user who wants to appropriately select a type of cleaning according to a state of the printing head. Therefore, there is a concern that appropriate cleaning cannot be selected, and the ink is excessively consumed for the cleaning.

SUMMARY

A printing apparatus includes: a printing head including a plurality of nozzles configured to eject an ink; a control unit configured to control ejection of the ink by the printing head; a display unit; an operation reception unit configured to receive an operation from outside; and a cleaning unit configured to execute cleaning of the printing head, in which the control unit causes the printing head to eject the ink from the plurality of nozzles to a medium, thereby causing the printing head to print a test pattern, causes the display unit to display a plurality of test pattern images that are test pattern images obtained by simulating a printing result of the test pattern and whose printing defectiveness degrees are different as a plurality of options, receives selection of the test pattern image through the operation reception unit, and causes the cleaning unit to execute cleaning corresponding to the selected test pattern image among the plurality of types of cleaning associated with the plurality of test pattern images in advance.

A method for controlling a printing apparatus configured to perform printing by using a printing head including a plurality of nozzles configured to eject an ink, the method includes: a test pattern printing step of causing the printing head to eject an ink from the plurality of nozzles to a medium, thereby printing a test pattern; a test pattern image display step of displaying a plurality of test pattern images that are test pattern images obtained by simulating a printing result of the test pattern and whose printing defectiveness degrees are different as a plurality of options on a display unit; a selection reception step of receiving selection of the test pattern image from outside; and a cleaning step of executing, on the printing head, cleaning corresponding to the selected test pattern image among the plurality of types of cleaning associated with the plurality of test pattern images in advance, which is cleaning of the printing head.

DESCRIPTION OF EMBODIMENTS

Hereinafter, embodiments of the present disclosure will be described with reference to the drawings. The drawings are merely examples for describing the embodiment. Since each drawing is an example, proportions, shapes, and shades may not be accurate, may not match each other, or some parts may be omitted.

1. Apparatus Configuration

Figure 1:
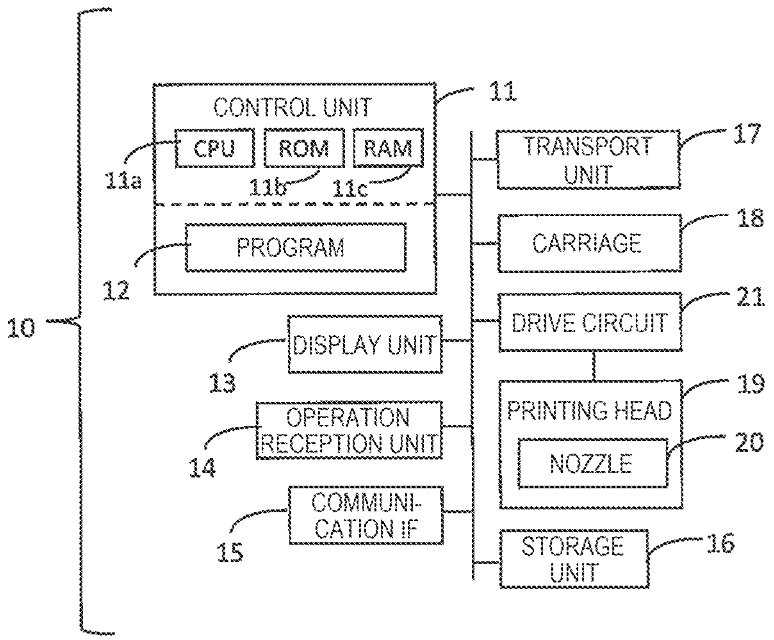
FIG. 1 is a diagram schematically showing an apparatus configuration.

FIG. 1 schematically shows a configuration of a printing apparatus 10 according to the embodiment. The printing apparatus 10 includes a control unit 11, a display unit 13, an operation reception unit 14, a communication IF 15, a storage unit 16, a transport unit 17, a carriage 18, a printing head 19, a drive circuit 21, and the like. The IF is an abbreviation for an interface. The control unit 11 includes one or more ICs including a CPU 11*a* serving as a processor, a ROM 11*b*, a RAM 11*c*, and the like, and other nonvolatile memories.

In the control unit 11, the processor, that is, the CPU 11*a* controls the printing apparatus 10 by executing arithmetic processing according to one or more programs 12 stored in the ROM 11*b*, other memories, or the like by using the RAM 11*c* or the like as a work area. The processor is not limited to one CPU, and may have a configuration in which the processing is performed by a plurality of CPUs or a hardware circuit such as an ASIC, or may have a configuration in which the CPU and the hardware circuit cooperate with each other to perform the processing.

The display unit 13 is a unit for displaying visual information, and is implemented by, for example, a liquid crystal display or an organic EL display. The display unit 13 may have a configuration including a display and a drive circuit for driving the display. The operation reception unit 14 is a unit for receiving an operation performed by a user, and is implemented by, for example, a physical button, a touch panel, a mouse, or a keyboard. Of course, the touch panel may be implemented as a function of the display unit 13.

The communication IF 15 is a generic term of one or more IFs for allowing the printing apparatus 10 to be connected to an external apparatus in a wired or wireless manner in accordance with a predetermined communication protocol including a known communication standard. Examples of the external apparatus include various communication apparatuses such as a personal computer, a server, a smartphone, and a tablet terminal.

The storage unit 16 is implemented by, for example, a storage device such as a hard disk drive or a solid-state drive. The storage unit 16 may be a part of a memory provided in the control unit 11. Further, the storage unit 16 may be understood as a part of the control unit 11. Various pieces of information necessary for controlling the printing apparatus 10 are stored in the storage unit 16.

The transport unit 17 is a unit for transporting a medium in a predetermined transport direction, and includes a rotating roller and a motor that rotates the roller or the like. In the following description, upstream and downstream of transport are simply referred to as upstream and downstream. The medium is typically paper, but in addition to the paper, various materials that can be printed with ink such as fabric or a film can be adopted as the medium. Further, the transport direction is also referred to as a sub-scanning direction. The transport unit 17 may be a mechanism that transports the medium by placing the medium on a belt or a pallet.

The carriage 18 is a mechanism that can reciprocate along a predetermined main scanning direction by receiving power provided by a carriage motor (not shown). The main scanning direction and the sub-scanning direction intersect. The intersection between the main scanning direction and the sub-scanning direction may be understood as orthogonal or substantially orthogonal. The carriage 18 is mounted with the printing head 19. Therefore, the printing head 19 reciprocates along the main scanning direction together with the carriage 18. The movement of the printing head 19 and the movement of the carriage 18 are synonymous.

The printing head 19 includes a plurality of nozzles 20 that can eject the ink. The drive circuit 21 that drives the nozzles 20 under control performed by the control unit 11 is coupled to the printing head 19. The nozzle 20 ejects a dot that is a liquid droplet. The printing head 19 ejects the ink based on printing data for printing an image. As is known, the control unit 11 controls application of a drive signal to a drive element (not shown) provided in each nozzle 20 through the drive circuit 21 according to the printing data, thereby printing an image on a medium by ejecting or not ejecting a dot from each nozzle 20. The printing head 19 can eject inks having various colors such as a cyan (C) ink, a magenta (M) ink, a yellow (Y) ink, and a black (K) ink. Of course, the colors of the inks ejected by the printing head 19 are not limited to the CMYK. Further, the printing head 19 can eject various liquids including the ink and a liquid that does not correspond to the ink.

Figure 2:
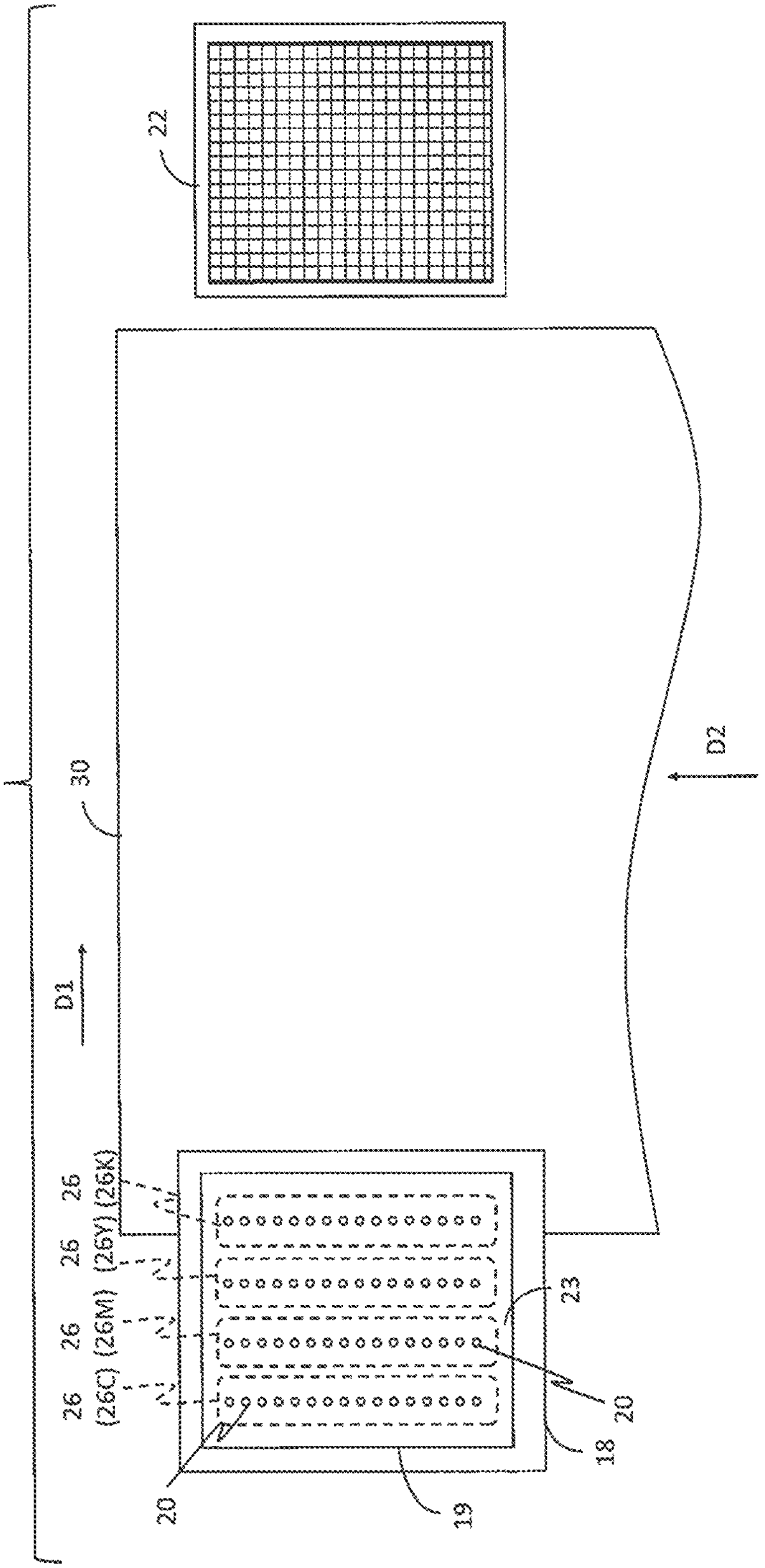
FIG. 2 is a diagram showing a relationship between a medium and a printing head when viewed from above.

FIG. 2 schematically shows a relationship between a medium 30 and the printing head 19 as viewed from above. The printing head 19 mounted on the carriage 18 performs forward movement that is movement from one end to the other end in a main scanning direction D1, or backward movement that is movement from the other end to one end together with the carriage 18. FIG. 2 shows an example of arrangement of the nozzles 20 on a nozzle surface 23. The nozzle surface 23 is a lower surface of the printing head 19, and is a surface facing the medium 30. Small circles within the nozzle surface 23 represent the nozzles 20.

The printing head 19 includes nozzle rows 26 for the respective ink colors in a configuration in which a supply of the inks having the respective colors is received from a liquid-holding unit (not shown) referred to as an ink cartridge, an ink tank, or the like and the inks having the respective colors are ejected from the nozzles 20. FIG. 2 shows an example of the printing head 19 that ejects the CMYK inks. A nozzle row 26 made of the nozzles 20 that eject the C ink is a nozzle row 26C. Similarly, a nozzle row 26 made of the nozzles 20 that eject the M ink is a nozzle row 26M, a nozzle row 26 made of the nozzles 20 that eject the Y ink is a nozzle row 26Y, and a nozzle row 26 made of the nozzles 20 that eject the K ink is a nozzle row 26K.

In the example in FIG. 2, the nozzle rows 26C, 26M, 26Y, and 26K are arranged along the main scanning direction D1. Further, a plurality of nozzle rows 26 of the respective colors are disposed at the same positions in a transport direction D2. One nozzle row 26 is implemented by the plurality of nozzles 20 whose nozzle interval that is an interval between the nozzles 20 in the transport direction D2 is constant or substantially constant.

A direction in which the plurality of nozzles 20 that constitute the nozzle row 26 are arranged is also referred to as a nozzle arrangement direction. In the example in FIG. 2, the nozzle arrangement direction is parallel to the transport direction D2. Therefore, it can be said that the plurality of nozzles 20 that constitute the nozzle row 26 are arranged in the transport direction D2. In such a configuration, the nozzle arrangement direction is orthogonal to the main scanning direction D1. However, the nozzle arrangement direction may not be parallel to the transport direction D2, and may be oblique to the transport direction D2. Regardless of whether the nozzle arrangement direction is parallel to the transport direction D2 or not, it can be said that the nozzle arrangement direction intersects with the main scanning direction D1, or it can be said that the plurality of nozzles 20 that constitute the nozzle row 26 are arranged at a predetermined nozzle interval in the transport direction D2. Therefore, even if the nozzle arrangement direction is oblique to the transport direction D2, it is interpreted that the plurality of nozzles 20 that constitute the nozzle row 26 are also arranged in the transport direction D2.

An operation in which the printing head 19 ejects the ink while the carriage 18 moves along the main scanning direction D1 is referred to as main scanning or pass. Further, an operation in which the transport unit 17 transports the medium 30 downstream by a predetermined distance between passes is referred to as paper feeding. Generally, the control unit 11 controls the printing head 19, the carriage 18, and the transport unit 17, whereby it is possible to execute the pass and the paper feeding to print a two-dimensional image on the medium 30. Alternatively, the carriage 18 can be reciprocated not only in the main scanning direction D1 but also in the transport direction D2, and is relatively moved upstream with respect to the medium 30, whereby effects the same as those of the paper feeding may be achieved. In the embodiment, the control unit 11 causes the printing head 19 to eject the ink from the plurality of nozzles 20 to the medium 30 to print a test pattern.

The printing apparatus 10 includes a maintenance box 22 that receives and stores a waste ink. In the following description, the maintenance box 22 is abbreviated as the MTB 22. The MTB 22 is disposed at a predetermined position outside a range through which the medium 30 passes that is a movement range of the printing head 19 based on the carriage 18. The control unit 11 controls the carriage 18 to move the printing head 19 to a position where the nozzle surface 23 of the printing head 19 faces the MTB 22, and then cleans the printing head 19. In the cleaning, the drive circuit 21 causes the ink to be forcibly ejected from the nozzles 20 of the printing head 19 by using a specific drive signal for the cleaning, so that clogging of the nozzles 20 is improved. The ink ejected during the cleaning is received by the MTB 22. A configuration related to cleaning execution of the printing head 19 is also referred to as a "cleaning unit". It may be understood that the cleaning unit includes the drive circuit 21 and a part of the control unit 11 that controls the drive circuit 21 by cooperating with the program 12, and further includes the MTB 22.

The configuration of the printing apparatus 10 shown in FIG. 1 may be implemented by one printer, or may be implemented by a plurality of apparatuses communicably connected to one another. That is, the printing apparatus 10 may be the printing system 10 in fact. The printing system 10 includes, for example, a printing control device that functions as the control unit 11, and a printer including the transport unit 17, the carriage 18, the printing head 19, the drive circuit 21, and the like. The display unit 13 and the operation reception unit 14 may be on either a printing control device side or a printer side. A method for controlling the printing apparatus is implemented by such a printing apparatus 10 or printing system 10.

2. Cleaning Control

Figure 3:
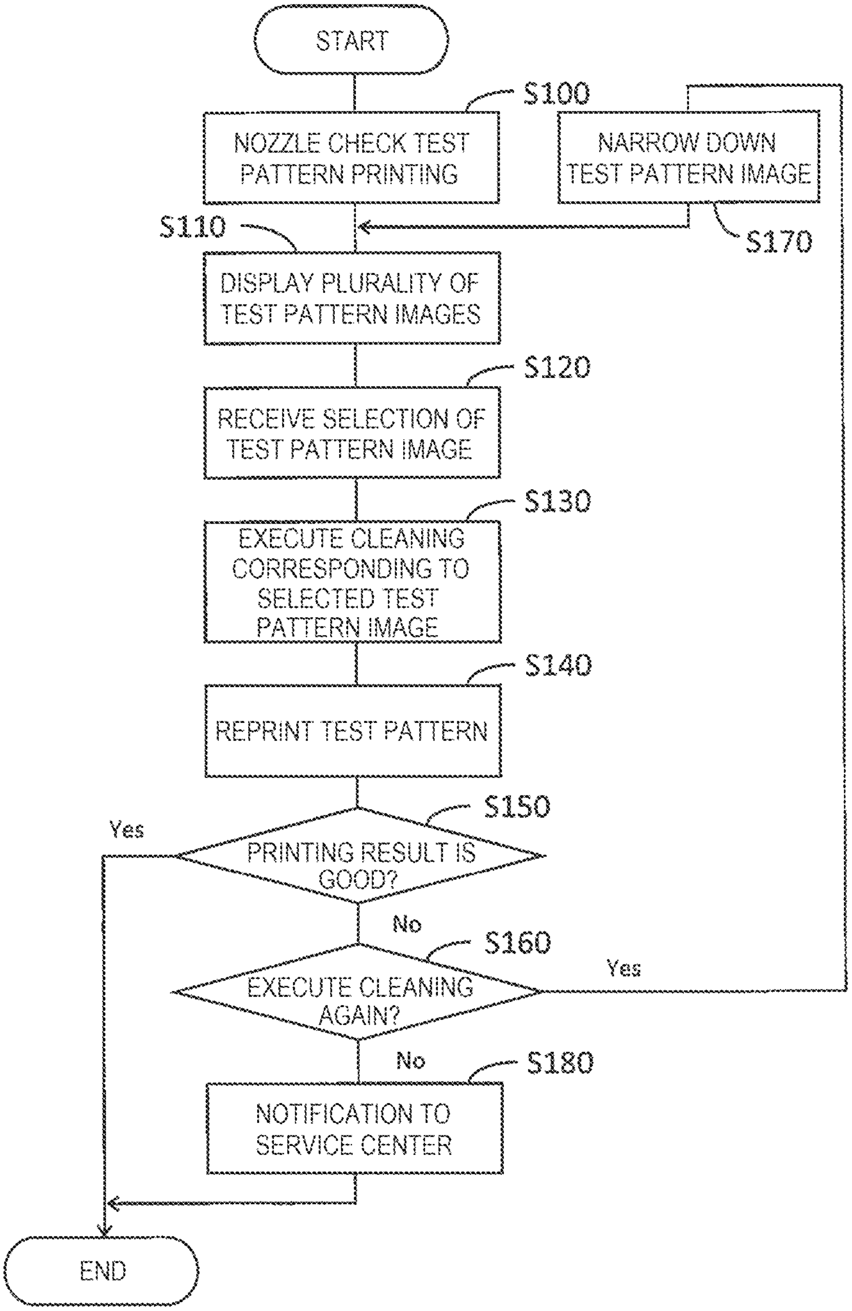
FIG. 3 is a flowchart showing cleaning control according to a first embodiment.

FIG. 3 is a flowchart showing cleaning control executed by the control unit 11 according to the program 12. When receiving a printing instruction of a test pattern for a nozzle check from the user, the control unit 11 executes the flowchart. The test pattern for a nozzle check is a test pattern for evaluating printing defectiveness, that is, non-defectiveness or defectiveness of each nozzle 20. When operating the operation reception unit 14, or operating an external apparatus that can communicate with the printing apparatus 10 via the communication IF 15, the user can issue the printing instruction of the test pattern to the printing apparatus 10.

In step S100, the control unit 11 causes the printing head 19 to eject the ink from the nozzles 20 to the medium 30 based on the printing data, thereby printing the test pattern. Step S100 corresponds to a "test pattern printing step". The printing data for printing the test pattern is stored, for example, in the storage unit 16 in advance.

Figure 4:
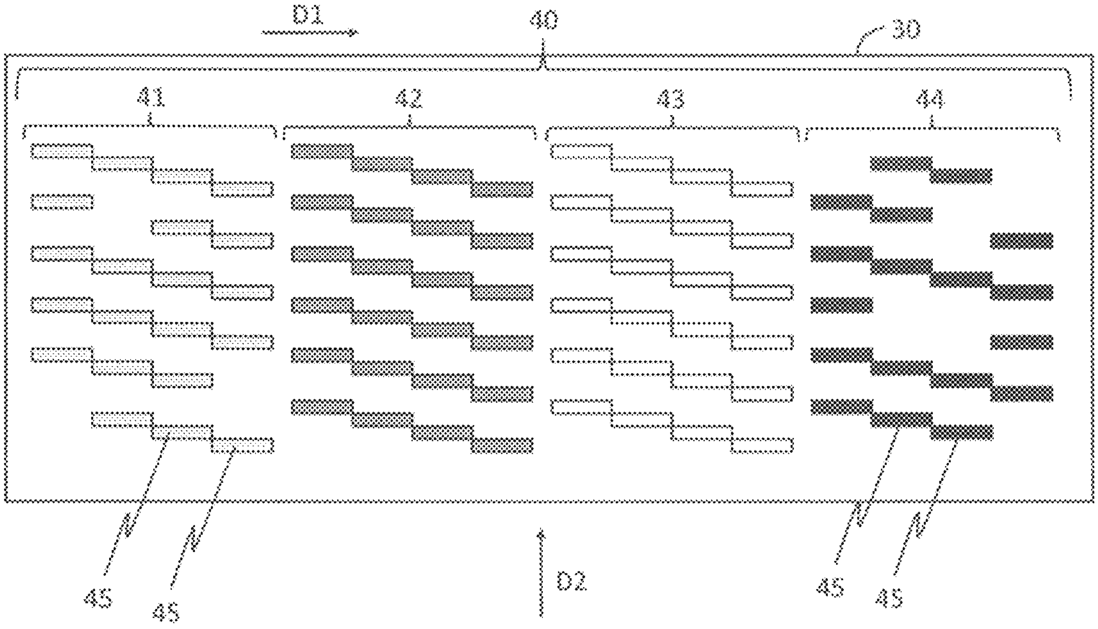
FIG. 4 is a diagram showing an example of a printed test pattern.

FIG. 4 exemplifies a test pattern 40 printed on the medium 30 in step S100. The test pattern 40 includes a plurality of ruled line groups that are a plurality of patterns formed for each nozzle row 26. According to the printing head 19 in FIG. 2, the test pattern 40 includes a first ruled line group 41 printed with the C ink by the nozzle row 26C, a second ruled line group 42 printed with the M ink by the nozzle row 26M, a third ruled line group 43 printed with the Y ink by the nozzle row 26Y, and a fourth ruled line group 44 printed with the K ink by the nozzle row 26K. The plurality of ruled line groups are arranged along the main scanning direction D1. Each of the first ruled line group 41, the second ruled line group 42, the third ruled line group 43, and the fourth ruled line group 44 is a pattern for each nozzle row 26 corresponding to a different ink. However, as long as a design of the test pattern 40 can evaluate the ink ejection performed by the nozzles 20 of each nozzle row 26, the design of the test pattern 40 may not be the design as shown in FIG. 4. The test pattern 40 may be, for example, a design in which band-shaped patterns of each ink color are arranged, or a design including characters.

One ruled line group printed by one nozzle row 26 is a set of ruled lines 45 of the nozzles 20 formed by the dots ejected by the nozzles 20 that constitute the nozzle row 26. Each ruled line 45 has a length component in the main scanning direction D1. The ruled line 45 may be a solid line or a broken line. A specific design of the ruled line group is not particularly limited, but visibility is considered. For example, the ruled lines 45 formed by the adjacent nozzles 20 in the transport direction D2 within the common nozzle row 26 are formed to deviate from one another in the main scanning direction D1. When a certain nozzle 20 is clogged, the ruled line 45 to be originally formed by the nozzle 20 misses in the test pattern 40 on the medium 30. In the example in FIG. 4, some ruled lines 45 miss in the first ruled line group 41 and the fourth ruled line group 44.

In step S110, the control unit 11 causes the display unit 13 to display, as a plurality of options, a plurality of test pattern images whose printing defectiveness degrees are different and that are test pattern images obtained by simulating printing results of the test pattern 40. It is assumed that simulating a printing result of the test pattern 40 means simulating at least a part of the test pattern 40. Here, one test pattern image is an image obtained by simulating one ruled line group. The plurality of test pattern images are stored in the storage unit 16 in advance. Step S110 corresponds to a "test pattern image display step".

Figure 5:
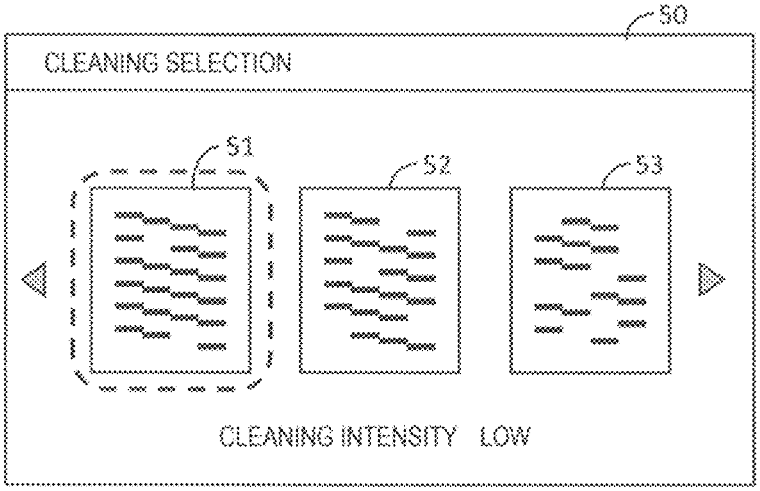
FIG. 5 is a diagram showing an example of a cleaning selection screen.

FIG. 5 exemplifies a cleaning selection screen 50 displayed on the display unit 13 in step S110. The cleaning selection screen 50 is a type of a UI screen that can receive an input of the user. The UI is an abbreviation for a user interface. The cleaning selection screen 50 includes a plurality of test pattern images 51, 52, and 53. In the example in FIG. 5, three types of test pattern images are displayed. But of course, the number of types of the test pattern images and the cleaning to be described later may be more than three.

Each of the plurality of test pattern images expresses a printing defectiveness degree based on a ruled line missing degree. In the example in FIG. 5, the test pattern image 51 has the least number of missing ruled lines, and the test pattern image 53 has the largest number of missing ruled lines. A type of the cleaning is associated with each of the plurality of test pattern images in advance. That is, the control unit 11 recognizes a one-to-one relationship between the test pattern image and the type of the cleaning in advance. For example, the test pattern image 51 is associated with the cleaning of intensity="low", the test pattern image 52 is associated with the cleaning of intensity="medium", and the test pattern image 53 is associated with the cleaning of intensity="high". The intensity of the cleaning is expressed in differences in factors such as time for executing the cleaning, an amount of the ink ejected by each nozzle 20 for the cleaning, and intensity of the drive signal given to each nozzle 20 by the drive circuit 21 for the cleaning. The higher the intensity of the cleaning, the longer, more, or stronger the setting of the factors are. A difference in the intensity of the cleaning is a difference in the type of the cleaning. Further, as will also be described later, the plurality of test pattern images displayed on the cleaning selection screen 50 may include a test pattern image corresponding to no cleaning.

In step S120, the control unit 11 receives selection of a test pattern image from outside through the operation reception unit 14. Step S120 corresponds to a "selection reception step". The user selects a test pattern image by operating the operation reception unit 14. That is, the user visually compares the test pattern 40 printed in step S100 with the plurality of test pattern images displayed on the display unit 13 in step S110, and selects a test pattern image whose ruled line missing degree most matches a missing degree of the ruled line 45 in the test pattern 40. In the example in FIG. 5, the test pattern image 51 is selected. On the cleaning selection screen 50, a type of the cleaning corresponding to the currently selected test pattern image may be indicated by characters or the like in an easy-to-understand manner. When the user performs a predetermined operation for confirming the selection of the test pattern image, the control unit 11 receives the selection of the test pattern image.

In step S130, the control unit 11 causes the cleaning unit to execute cleaning corresponding to the test pattern image selected in step S120 among a plurality of types of cleaning associated with the plurality of test pattern images in advance. Step S130 corresponds to a "cleaning step".

In step S140, the control unit 11 reprints the test pattern. Step S140 may be understood as processing the same as that of step S100. That is, the test pattern 40 is reprinted after step S130 in order to confirm effects of the cleaning in step S130. The user visually evaluates the test pattern 40 reprinted on the medium 30, determines whether a printing result is good, and inputs a determination result to the printing apparatus 10.

When inquiring whether the result of the reprinting the test pattern 40 is good of the user on the display unit 13, and receiving an input indicating that the printing result is good from the user through the operation reception unit 14, the control unit 11 determines "Yes" in step S150 and ends the flowchart in FIG. 3. On the other hand, when receiving an input indicating that the printing result is not good from the user through the operation reception unit 14 for the inquiry, the control unit 11 proceeds from determination of "No" in step S150 to step S160.

In step S160, when inquiring whether to execute the cleaning again of the user on the display unit 13, and receiving an instruction for executing the cleaning again from the user through the operation reception unit 14, the control unit 11 determines "Yes" in step S160 and proceeds to step S170. On the other hand, when receiving an instruction indicating that the cleaning is not executed again from the user through the operation reception unit 14, the control unit 11 proceeds from determination of "No" in step S160 to step S180.

In step S180, the control unit 11 notifies a predetermined service center that a defect occurs in the printing head 19 by network communication through the communication IF 15, and ends the flowchart in FIG. 3. The service center is, for example, a department provided for the user of the printing apparatus 10 by a vendor of the printing apparatus 10, and provides a service such as dispatching a service man in response to the notification from the user.

However, the processing at and after step S150 may be simplified. When receiving an input indicating that a printing result is not good from the user and determining as "No" in step S150, the control unit 11 may regard the input indicating that the printing result is not good as the instruction for executing the cleaning again, and directly proceed to step S170.

After narrowing down the test pattern image in step S170, the control unit 11 executes step S110. Specifically, the control unit 11 excludes a test pattern image corresponding to cleaning having intensity equal to or lower than intensity of cleaning executed before receiving the instruction for executing the cleaning again from a display target, and prevents the test pattern image from being displayed in the next step S110. For example, when cleaning with intensity="low" is executed in the most recent step S130, the control unit 11 excludes the test pattern image 51 corresponding to the cleaning with the intensity="low", and narrows down the test pattern images 52 and 53 (step S170), and causes the display unit 13 to display the test pattern images 52 and 53 narrowed down in this way (step S110). The processing at and after step S110 is as described above.

However, when performing step S170 after the cleaning unit executes executable cleaning having the highest intensity in step S130, the test pattern images that can be displayed in step S110 thereafter may disappear. Therefore, when receiving the instruction for executing the cleaning again after the cleaning having the highest intensity is executed in step S130, the control unit 11 does not execute the narrowing down in step S170, and causes the display unit 13 to display a test pattern image corresponding to the cleaning having the highest intensity in step S110.

In FIG. 3, a flowchart without step S170 can also be assumed. That is, when receiving the instruction for executing the cleaning again, the control unit 11 may simply return to step S110. Similarly, in FIGS. 6 and 9 to be described later, a flowchart without steps S172 and S174 can be assumed.

Second and subsequent cleaning in the flowchart is also referred to as "retry" for the sake of convenience. The control unit 11 may set an upper limit on the number of retries in one flowchart. For example, the upper limit on the number of retries is three times. When determining "No" in step S150 after the retry is executed three times, the control unit 11 may forcibly proceed to step S180.

The description of the embodiment up to this point is also referred to as a first embodiment.

In the following embodiments, the first embodiment is applied in principle, and differences from the first embodiment will be described.

3. Second Embodiment

Figure 6:
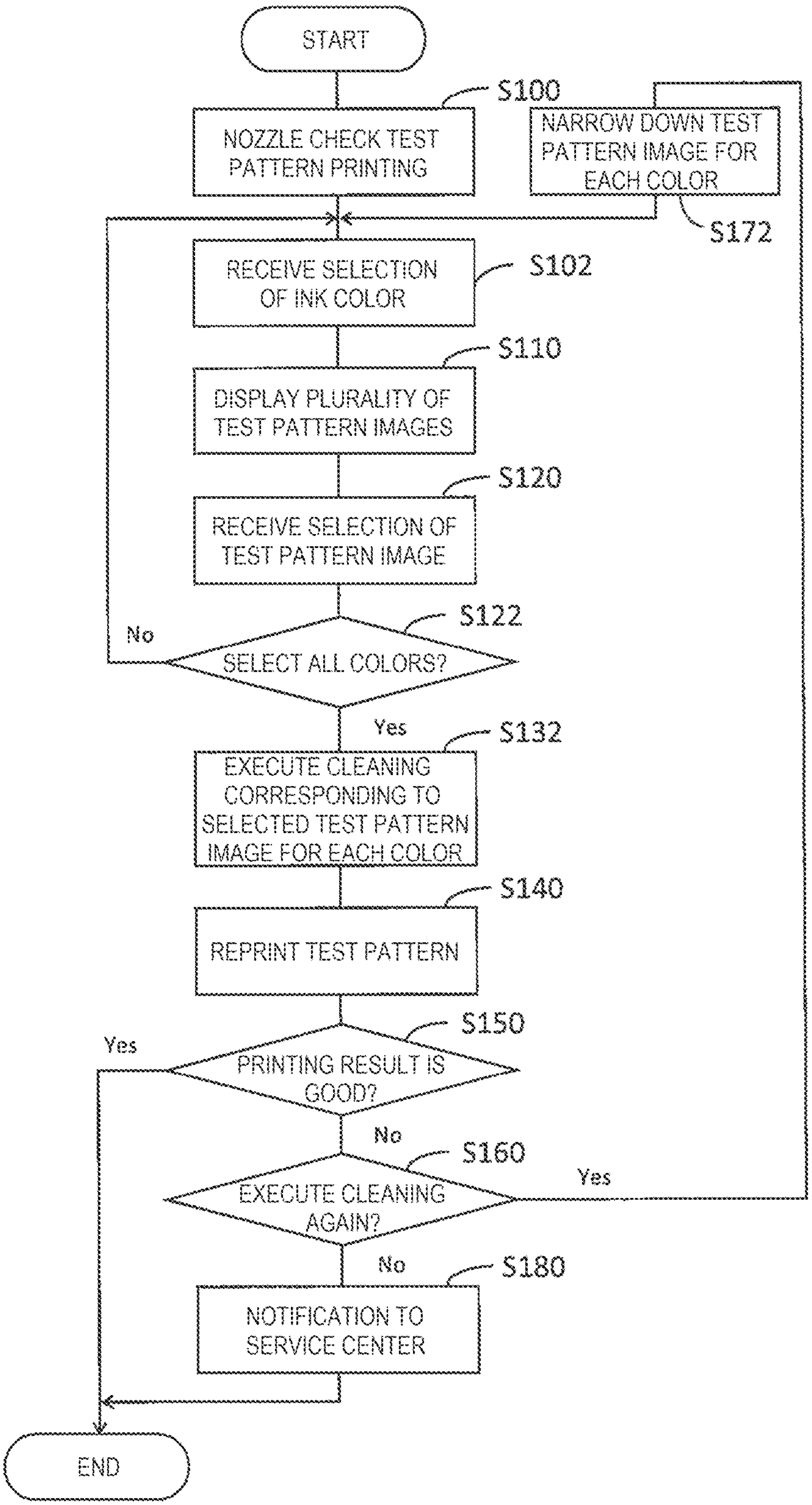
FIG. 6 is a flowchart showing cleaning control according to a second embodiment.

FIG. 6 is a flowchart showing cleaning control according to a second embodiment executed by the control unit 11 according to the program 12.

In step S102 after step S100, the control unit 11 receives selection of a color of the ink. That is, after seeing the test pattern 40 printed in step S100, the user selects a color of an ink desired to improve deterioration in printing quality due to dot missing by operating the operation reception unit 14.

Figure 7A:
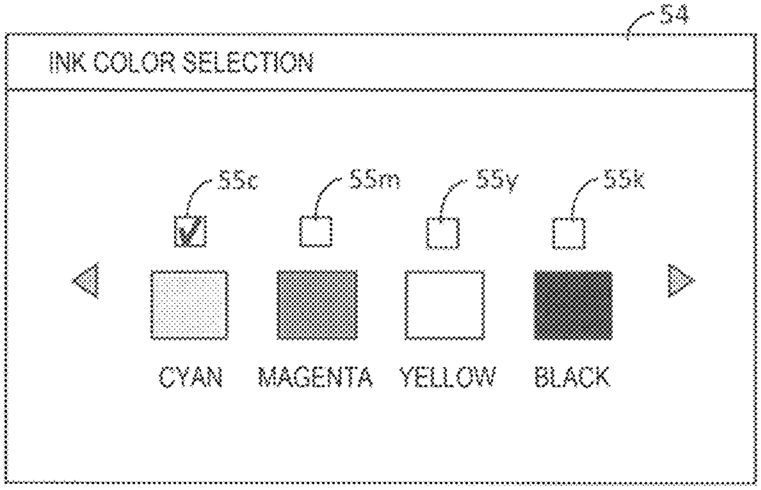
FIG. 7A is a diagram showing an example of a color selection screen.

FIG. 7A exemplifies a color selection screen 54 for receiving selection of a color of the ink, which is a UI screen displayed by the display unit 13. The color selection screen 54 includes a UI for selecting the CMYK that are the colors of the ink that can be ejected by the printing head 19, for example, check boxes 55*c*, 55*m*, 55*y*, and 55*k* for each of the CMYK. The user selects a color by checking any one of the check boxes 55*c*, 55*m*, 55*y*, and 55*k*. In the example in FIG. 7A, C is selected. The control unit 11 receives selection of such a color.

In step S120 after going through steps S102 and S110, as described above, the control unit 11 receives the selection of any one of the test pattern images displayed on the cleaning selection screen 50, and receives the selection as selection linked to the color of the ink received in step S102. For example, on the premise of a situation in FIGS. 7A and 5, the control unit 11 recognizes that the test pattern image 51 is selected for C.

In step S122, the control unit 11 determines whether selection of the test pattern images is ended for all the colors of the ink that can be ejected by the printing head 19, proceeds to step S132 from "Yes" when the selection is ended for all the colors, and returns to step S102 from "No" when the selection of all the colors is not ended.

Depending on a printing result of the test pattern 40, there is a color of the ink that does not need the cleaning. In the example in FIG. 4, since there is no missing of the ruled line 45 in the second ruled line group 42 and the third ruled line group 43, it can be said that no cleaning is needed for M and Y. Therefore, the cleaning selection screen 50 may include an option indicating "no cleaning". When no cleaning is selected for a certain color of the ink, the control unit 11 treats the color as selected in step S122 as in a case where a test pattern image is selected. For example, the control unit 11 may display a test pattern image having no missing ruled line in a similar manner as other test pattern images 51, 52, and 53 on the cleaning selection screen 50, and recognize that no cleaning is selected when the test pattern image having no missing ruled line is selected.

In step S132, as in step S130, the control unit 11 causes the cleaning unit to execute cleaning corresponding to the test pattern image selected in step S120. However, in step S132, cleaning corresponding to a test pattern image is executed on the nozzle row 26 that ejects the ink having a color linked to selection of the test pattern image. That is, cleaning corresponding to the test pattern image is executed for each color of the ink. For example, when the test pattern image 51 is selected for C and the test pattern image 52 is selected for K, the cleaning unit executes the cleaning with the intensity="low" on the nozzle row 26C, and executes the cleaning with the intensity="medium" on the nozzle row 26K. Further, if no cleaning is selected for M and Y, naturally no cleaning is executed on the nozzle row 26M and the nozzle row 26Y.

In step S172, as in step S170, the control unit 11 narrows down the test pattern image. However, in step S172, the test pattern image is narrowed down for each color of the ink. For example, in the most recent step S132, it is assumed that the cleaning with the intensity="low" is executed on the nozzle row 26C, and the cleaning with the intensity="medium" is executed on the nozzle row 26K. In this case, the control unit 11 excludes the test pattern image 51 from the test pattern images displayed on the cleaning selection screen 50 when C is selected, and excludes the test pattern images 51 and 52 from the test pattern images displayed on the cleaning selection screen 50 when K is selected.

4. Third Embodiment

In the second embodiment, the type of the cleaning can be made different for each nozzle row 26 of each color, whereas in a third embodiment, the type of the cleaning can be made different for each region of the printing head 19.

Figure 8:
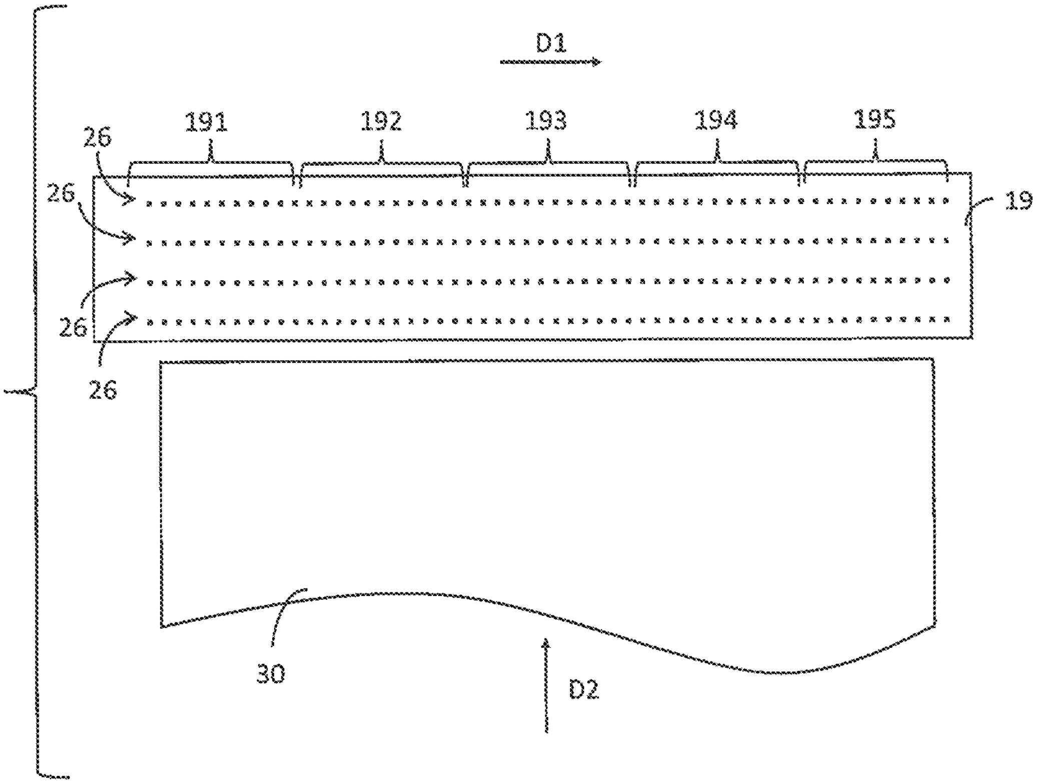
FIG. 8 is a diagram showing a printing head of an example different from that of FIG. 2 when viewed from above.

FIG. 8 schematically shows an example of the medium 30 and the printing head 19 when viewed from above, which is different from that of FIG. 2. FIG. 2 shows a so-called serial type head that moves in the main scanning direction D1 by the carriage 18, but FIG. 8 shows a so-called line head that does not include the carriage 18. FIG. 8 shows arrangement of the plurality of nozzles 20 by arrangement of dots very simply. According to FIG. 8, in the printing head 19, the nozzle rows 26 are provided by being arranged in a plurality of rows along the transport direction D2, the main scanning direction D1 being a nozzle arrangement direction. Each nozzle row 26 has a length over a width of the medium 30 in the main scanning direction D1. The printing head 19 performs printing by ejecting the ink from the nozzle rows 26 to the transported medium 30 in a stationary state. It is needless to say that the nozzle rows 26 shown in FIG. 8 may be understood to correspond to inks having colors different from one another, or may be understood to correspond to inks having the same color.

The printing head 19 serving as such a line head is suitable for producing a relatively large-sized printed matter such as a poster, and is long in the main scanning direction D1. Therefore, the printing head 19 can be divided into a plurality of regions and grasped. In the example in FIG. 8, the printing head 19 is divided into a plurality of regions 191, 192, 193, 194, and 195 along the main scanning direction D1. Since the printing head 19 may be implemented by coupling a plurality of head chips in the main scanning direction D1, the plurality of head chips may be interpreted as the regions 191, 192, 193, 194, and 195.

Figure 9:
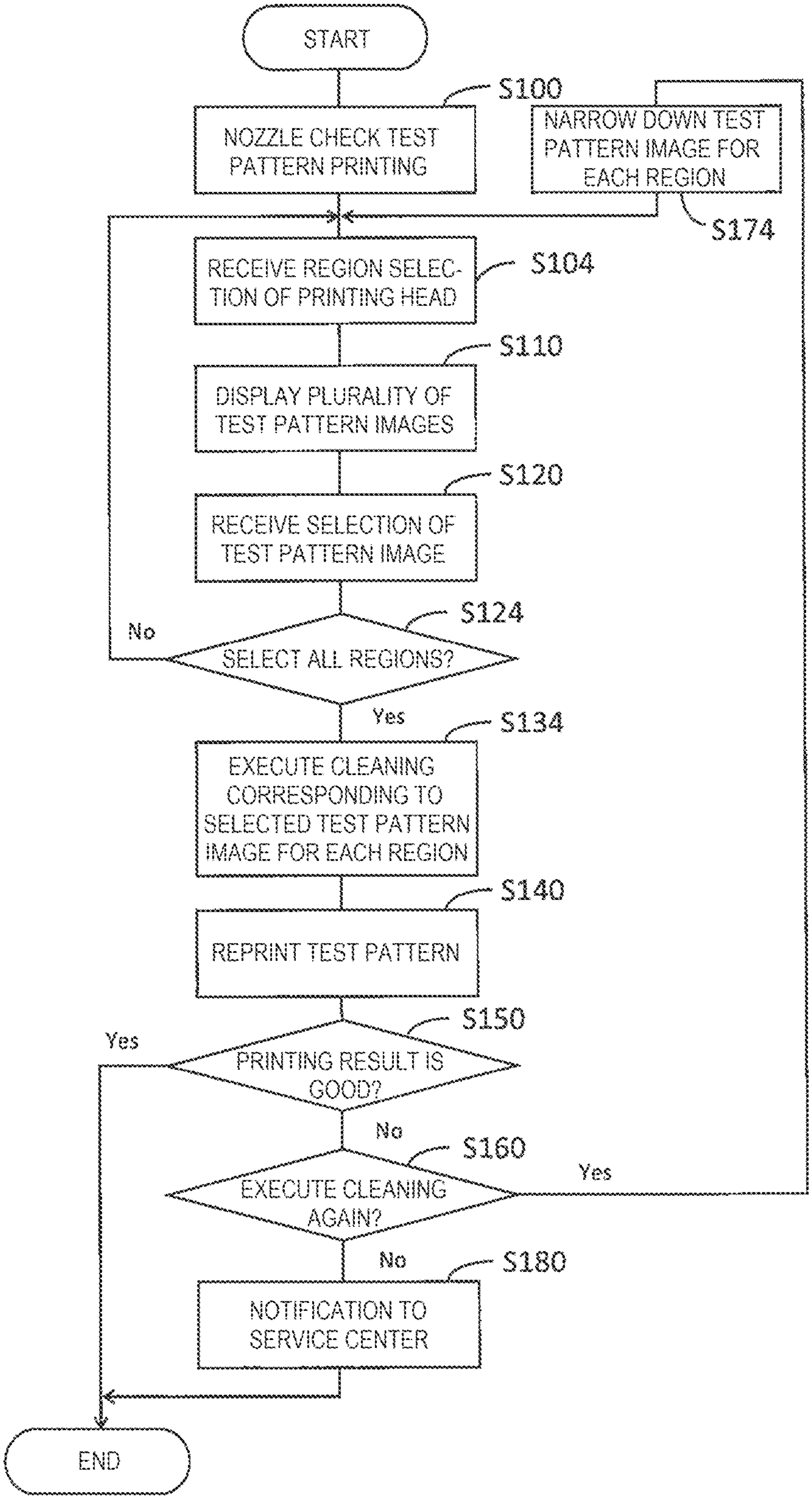
FIG. 9 is a flowchart showing cleaning control according to a third embodiment.

FIG. 9 is a flowchart showing cleaning control according to the third embodiment executed by the control unit 11 according to the program 12.

In step S104 after step S100, the control unit 11 receives selection of a region of the printing head 19. That is, after viewing the test pattern 40 printed in step S100, the user selects a region where deterioration in printing quality due to dot missing is desired to be improved by operating the operation reception unit 14. When the printing head 19 has the configuration shown in FIG. 8, illustration is omitted, and it may be understood that the test pattern 40 as shown in FIG. 4 is printed on the medium 30 in a state of being rotated by 90 degrees. That is, according to the line head, a longitudinal direction of the ruled lines 45 that constitute the line groups of the test pattern 40 is parallel to the transport direction D2.

Figure 7B:
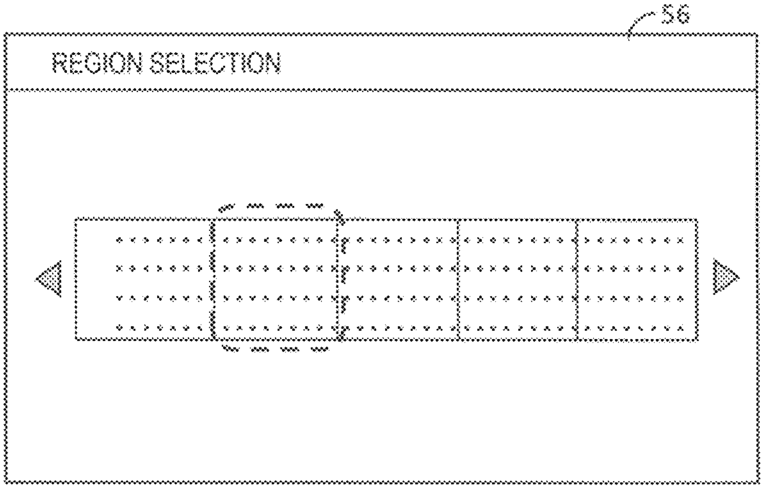
FIG. 7B is a diagram showing an example of a region selection screen.

FIG. 7B exemplifies a region selection screen 56 for receiving selection of a region of the printing head 19, which is a UI screen displayed by the display unit 13. An image obtained by simulating the printing head 19 and the plurality of regions partitioning inside of the printing head 19 is drawn on the region selection screen 56. The user selects a region by an operation on such a UI. In the example in FIG. 7B, a second region from a left side of the printing head 19 is selected. The second region from the left side means the region 192 according to FIG. 8. The control unit 11 receives selection of such a region.

In step S120 after going through steps S104 and S110, as described above, the control unit 11 receives selection of any one of the test pattern images displayed on the cleaning selection screen 50, and receives the selection as selection linked to the region received in step S104. When the printing head 19 has the configuration shown in FIG. 8, illustration is omitted, and each test pattern image displayed on the cleaning selection screen 50 is also naturally an image obtained by simulating the test pattern 40 printed by the printing head 19 having the configuration shown in FIG. 8.

In step S124, the control unit 11 determines whether selection of a test pattern image is ended for all the regions of the printing head 19, proceeds to step S134 from "Yes" when the selection is ended for all the regions, and returns to step S104 from "No" when the selection of all the regions is not ended. Depending on a printing result of the test pattern 40, there is a region where the cleaning is not needed. Therefore, when no cleaning is selected as described in the second embodiment for a certain region of the printing head 19, the control unit 11 treats the region as selected in step S124 as in a case where a test pattern image is selected.

In step S134, as in step S130, the control unit 11 causes the cleaning unit to execute cleaning corresponding to the test pattern image selected in step S120. However, in step S134, cleaning corresponding to a test pattern image is executed on the nozzles 20 in a region linked to selection of the test pattern image. That is, cleaning corresponding to a test pattern image is executed for each region of the printing head 19. For example, when the test pattern image 51 is selected for the leftmost region 191 and the test pattern image 52 is selected for the second region 192 from the left side, the cleaning unit executes the cleaning with the intensity="low" on the nozzles 20 in the region 191, and executes the cleaning with the intensity="medium" on the nozzles 20 in the region 192. The cleaning is not executed for a region where no cleaning is selected.

In step S174, as in step S170, the control unit 11 narrows down the test pattern images. However, in step S174, a test pattern image is narrowed down for each region of the printing head 19. For example, in the most recent step S134, it is assumed that the cleaning with the intensity="low" is executed on the leftmost region 191, and the cleaning with the intensity="medium" is executed on the second region 192 from the left side. In this case, the control unit 11 excludes the test pattern image 51 from the test pattern images displayed on the cleaning selection screen 50 when the leftmost region 191 is selected, and excludes the test pattern images 51 and 52 from the test pattern images displayed on the cleaning selection screen 50 when the second region 192 from the left side is selected.

When the printing head 19 has the configuration shown in FIG. 8, it may be understood that the MTB 22 is moved to a position where the ink ejected from the region of the printing head 19 can be received. For example, when cleaning the region 191, the control unit 11 moves the MTB 22 to a position where the ink ejected from the region 191 can be received. The same applies when cleaning other regions. Further, even if the printing head 19 is the serial type head as shown in FIG. 2, the printing head 19 can be divided into a plurality of regions along the transport direction D2, and selection of a test pattern image and cleaning can be executed for each region.

5. Fourth Embodiment

"Autonomous determination" that automates a process from an evaluation of the test pattern 40 to determination of a type of the cleaning will be described.

Figure 10:
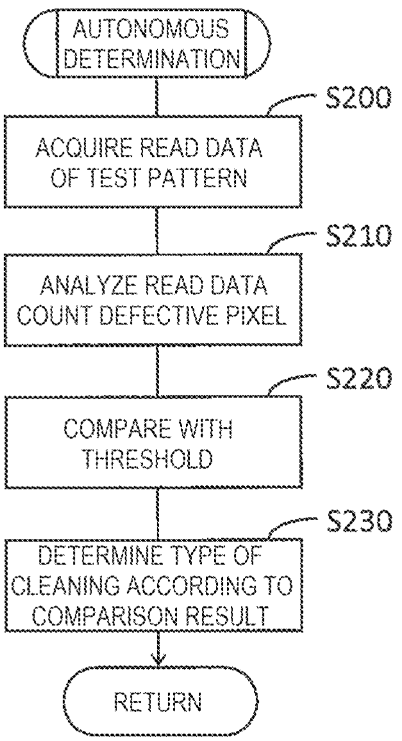
FIG. 10 is a flowchart showing autonomous determination.

FIG. 10 is a flowchart showing the autonomous determination executed by the control unit 11 according to the program 12. As a premise of the flowchart in FIG. 10, the printing apparatus 10 prints the test pattern 40. The user sets the medium 30 on which the test pattern 40 is printed by the printing apparatus 10 into a scanner (not shown), and causes the scanner to read the medium 30.

The control unit 11 acquires read data of the test pattern 40 (step S200). The read data is image data serving as a read result generated by the scanner reading the test pattern 40. A method for acquiring the read data does not matter. The printing apparatus 10 may be coupled to the scanner via the communication IF 15, and receive transmission of the read data from the scanner. Alternatively, the read data may be stored in a memory that can be carried by the user, and the printing apparatus 10 may read the read data from the memory.

In step S210, the control unit 11 analyzes the read data to determine the printing defectiveness degree. Here, the number of defective pixels is treated as a defectiveness degree, and the defective pixels are counted. The control unit 11 can appropriately perform conversion necessary for analyzing the read data such as converting the read data into luminance data. The defective pixel refers to a pixel that does not have color information or luminance that is originally included in the read data when the printing data used for printing the test pattern 40 is used as a reference. For example, in the read data, when a pixel is at a position corresponding to a pattern printed by the nozzles 20 of the nozzle row 26C, a pixel that should have a value corresponding to predetermined color information or luminance of the C ink but does not have such color information or luminance that should originally be present is determined as a defective pixel influenced by the dot missing. A detailed reference for determining whether a pixel is a defective pixel is not shown here. However, in any case, the control unit 11 analyzes the read data, determines a pixel whose color information or luminance does not satisfy a predetermined reference as a defective pixel, and counts the number of the defective pixels.

In step S220, the control unit 11 compares the number of the defective pixels counted in step S210 with preset thresholds.

In step S230, the control unit 11 determines a type of the cleaning according to a comparison result in step S220. That is, in steps S220 and S230, a type of the cleaning to be executed is determined according to the printing defectiveness degree.

For example, it is assumed that a first threshold and a second threshold are set as the thresholds, and the first threshold<the second threshold. When a count value, which is the number of the defective pixels, is larger than 0 and equal to or smaller than the first threshold, the control unit 11 determines the cleaning with the intensity="low". Further, the control unit 11 determines the cleaning with the intensity="medium" when the count value of the defective pixel is larger than the first threshold and equal to or smaller than the second threshold, and determines the cleaning with the intensity="high" when the count value of the defective pixel is larger than the second threshold.

Next, a first mode and a second mode will be described as a use mode of the autonomous determination in the embodiment.

First Mode:

In the first mode, after the test pattern is reprinted in step S140, the autonomous determination is presented to the user as one of options for retry.

When causing the display unit 13 to display the test pattern images in response to receiving an instruction for executing the cleaning again, the control unit 11 also causes the display unit 13 to display the autonomous determination as one of the options. That is, in step S110 executed after "Yes" in step S160, the control unit 11 includes a display of not only the test pattern images corresponding to types of the cleaning but also, for example, an icon for receiving selection of the autonomous determination on the cleaning selection screen 50. Then, when the autonomous determination is selected instead of a test pattern image by an operation of the user, the control unit 11 executes the autonomous determination. The read data acquired in step S200 in the autonomous determination in the first mode is read data by the scanner of the test pattern 40 reprinted in the most recent step S140. Then, the control unit 11 executes cleaning determined by the autonomous determination instead of step S130.

Second Mode:

In the second mode, first, the autonomous determination is executed, and when the retry is performed after the cleaning determined by the autonomous determination is executed, the test pattern images are presented to the user as described above. In the description of the second mode, the test pattern 40 printed to perform the autonomous determination is referred to as a "pre-test pattern" for the sake of convenience, and is distinguished from the test pattern 40 printed after the cleaning determined by the autonomous determination is executed. A difference between the pre-test pattern and the test pattern 40 printed after the cleaning determined by the autonomous determination is executed is a difference in a printing timing. That is, the control unit 11 causes the printing head 19 to print the pre-test pattern by ejecting the ink from the plurality of nozzles 20 to the medium 30 before printing the test pattern 40. Then, the control unit 11 starts the autonomous determination by acquiring the read data by the scanner of the printed pre-test pattern.

The control unit 11 causes the cleaning unit to execute cleaning of a type determined by the autonomous determination, and then causes the printing head 19 to eject the ink from the plurality of nozzles 20 to the medium 30, thereby causing the printing head 19 to print the test pattern 40, that is, execute the reprinting. In the second mode, the process from here on may be understood as processing after step S140. That is, in response to receiving the instruction for executing the cleaning again through the operation reception unit 14 ("Yes" in step S160) the control unit 11 causes the display unit to display the plurality of test pattern images (step S110).

Also in the autonomous determination, the cleaning can be determined for each color of the ink and each region of the printing head 19. That is, the control unit 11 may execute the processing in steps S210 to S230 for each color of the ink such as the CMYK, or for each region of the printing head 19, determine cleaning for each color of the ink and each region of the printing head 19, and execute the cleaning as determined.

6. Summary

As described above, according to the embodiment, the printing apparatus 10 includes: the printing head 19 including the plurality of nozzles 20 that can eject the ink; the control unit 11 that controls the ejection of the ink performed by the printing head 19; the display unit 13; the operation reception unit 14 that can receive the operation from the outside; and the cleaning unit that can clean the printing head 19. Then, the control unit 11 causes the printing head 19 to eject the ink from the plurality of nozzles 20 to the medium 30, thereby causing the printing head 19 to print the test pattern 40, causes the display unit 13 to display the plurality of test pattern images that are the test pattern images obtained by simulating the printing result of the test pattern 40 and whose printing defectiveness degrees are different as the plurality of options, receives the selection of the test pattern image through the operation reception unit 14, and causes the cleaning unit to execute the cleaning corresponding to the selected test pattern image among the plurality of types of cleaning associated with the plurality of test pattern images in advance.

According to the configuration, the printing apparatus 10 displays the plurality of test pattern images associated with different cleaning. Therefore, the user can select, through the selection of the test pattern image, optimum cleaning to improve printing defectiveness that occurs in the test pattern 40 by visually comparing the test pattern 40 printed by the printing apparatus 10 with the test pattern image. That is, it becomes easier for the user to select cleaning suitable for a state of the printing head 19. Then, since appropriate cleaning is easily selected, it is possible to avoid wasteful consumption of the ink by executing cleaning with intensity higher than necessary.

According to the embodiment, the control unit 11 may cause the printing head 19 to reprint the test pattern 40 after the cleaning by the cleaning unit is executed, and may not cause the display unit 13 to display the test pattern image corresponding to the cleaning having intensity equal to or lower than that of the cleaning executed before receiving the execution instruction when causing the display unit 13 to display the test pattern image in response to receiving the instruction for executing the cleaning again through the operation reception unit 14.

According to the configuration, when the cleaning of the retry is selected by the user, the control unit 11 can eliminate a possibility that cleaning with insufficient intensity is selected again depending on a current state of the printing head 19. As a result, it is possible to prevent the number of times of the retry from further increasing.

According to the embodiment, the printing head 19 includes the plurality of nozzle rows 26 in each of which the plurality of nozzles 20 are arranged and that eject the inks having colors different from one another.

The control unit 11 may cause the test pattern 40 including the plurality of patterns formed by the plurality of nozzle rows 26 to be printed, receive selection linked to a color of the ink that is selection of a test pattern image, and cause the cleaning unit to execute cleaning corresponding to the test pattern image related to the selection on the nozzle row 26 that ejects the ink having the color linked to the selection.

According to the configuration, the control unit 11 can cause the user to select optimum cleaning for the plurality of nozzle rows 26 that eject the inks having the colors different from one another through presentation of the test pattern image, and execute the cleaning for each nozzle row 26. Further, ink consumption is easily reduced as compared with a case where the same cleaning is uniformly executed on the nozzle rows 26 that constitute the printing head 19.

According to the embodiment, the control unit 11 may receive selection linked to a region of the printing head 19 that is selection of the test pattern image, and cause the cleaning unit to execute cleaning corresponding to the test pattern image related to the selection on the region linked to the selection.

According to the configuration, the control unit 11 can cause the user to select optimum cleaning for the regions of the printing head 19 through presentation of the test pattern image, and execute the cleaning for each region. Further, the ink consumption is easily reduced as compared with a case where the same cleaning is uniformly executed on the regions of the printing head 19.

According to the embodiment, the control unit 11 may cause the printing head 19 to reprint the test pattern 40 after the cleaning by the cleaning unit is executed, also cause the display unit 13 to display the autonomous determination as one of options when causing the display unit 13 to display the test pattern image in response to receiving the instruction for executing the cleaning again through the operation reception unit 14, acquire read data by a scanner of the reprinted test pattern 40 when receiving selection of the autonomous determination through the operation reception unit 14, determine a printing defectiveness degree based on the read data, determine a type of cleaning to be executed according to the defectiveness degree, and cause the cleaning unit to execute the determined type of cleaning.

According to the configuration, the control unit 11 can present the autonomous determination as one of the options to the user for the retry. Then, the autonomous determination can be performed according to the selection by the user, and optimum cleaning for the retry can be selected and executed.

According to the embodiment, the control unit 11 may cause the printing head 19 to eject the ink from the plurality of nozzles 20 to the medium 30 before printing the test pattern 40, thereby causing the printing head 19 to print the pre-test pattern, acquire read data by a scanner of the printed pre-test pattern, determine a printing defectiveness degree based on the read data, determine a type of cleaning to be executed according to the defectiveness degree, cause the cleaning unit to execute the determined type of cleaning, and then cause the printing head 19 to print the test pattern 40, and cause the display unit 13 to display the plurality of test pattern images in response to receiving the instruction for executing the cleaning again through the operation reception unit 14.

According to the configuration, the control unit 11 first can execute the autonomous determination and cleaning determined by the autonomous determination, and present the plurality of test pattern images to the user to cause the user to select cleaning for the retry.

Only some of combinations of the claims are described in the claims. However, in the embodiment, not only a one-to-one combination of an independent claim and a dependent claim, but also various combinations of a plurality of dependent claims are naturally included in the disclosed scope.

The embodiment discloses a method and the program 12 for implementing the method by cooperation with a processor, in addition to the printing apparatus 10.

That is, the method for controlling the printing apparatus 10 that performs printing by using the printing head 19 including the plurality of nozzles 20 that can eject the ink, the method includes: a test pattern printing step of causing the printing head 19 to eject the ink from the plurality of nozzles 20 to the medium 30, thereby printing the test pattern 40; a test pattern image display step of displaying a plurality of test pattern images that are the test pattern images obtained by simulating a printing result of the test pattern 40 and whose printing defectiveness degrees are different as the plurality of options on the display unit 13; a selection reception step of receiving selection of the test pattern image from outside; and a cleaning step of executing, on the printing head 19, cleaning corresponding to the selected test pattern image among the plurality of types of cleaning associated with the plurality of test pattern images in advance, which is cleaning of the printing head 19.

The cleaning of the printing head 19 by the cleaning unit includes, in addition to the processing of forcibly ejecting the ink from the nozzles 20, for example, processing of suctioning out, by a pump, the ink or the like clogged in the nozzle 20 from the nozzle 20 to outside of the nozzle surface 23, processing of wiping the nozzle surface 23 with a wiper, and the like. Various cleaning methods may be combined to provide a difference in the intensity of the cleaning.

What is claimed is:

1. A printing apparatus comprising:

a printing head including a plurality of nozzles configured to eject an ink;

a control unit configured to control ejection of the ink by the printing head;

a display unit;

an operation reception unit configured to receive an operation from outside; and a cleaning unit configured to execute cleaning of the printing head, wherein the control unit causes the printing head to eject the ink from the plurality of nozzles to a medium, thereby causing the printing head to print a test pattern, causes the display unit to display a plurality of test pattern images as a plurality of cleaning options from low cleaning intensity to high cleaning intensity, the plurality of test pattern images are obtained by simulating a printing result of the test pattern and whose printing defectiveness degrees are different, receives selection of one of the plurality of test pattern images through the operation reception unit, causes the cleaning unit to execute cleaning corresponding to the selected test pattern image among a plurality of types of cleaning associated with the plurality of test pattern images in advance, causes the printing head to eject an ink from the plurality of nozzles to a medium before printing the test pattern, thereby causing the printing head to print a pre-test pattern, acquires read data by a scanner of the printed pre-test pattern, determines a printing defectiveness degree based on the read data, and determines a type of the cleaning to be executed according to the defectiveness degree, causes the cleaning unit to execute the determined type of cleaning, and then causes the printing head to print the test pattern, and causes the display unit to display the plurality of test pattern images in response to receiving an instruction for executing cleaning again through the operation reception unit.

2. The printing apparatus according to claim 1, wherein the control unit causes the printing head to reprint the test pattern after cleaning by the cleaning unit is executed, and does not cause the display unit to display the test pattern image corresponding to cleaning having intensity equal to or lower than that of cleaning executed before receiving the execution instruction when causing the display unit to display the test pattern image in response to receiving an instruction for executing the cleaning again through the operation reception unit.

3. The printing apparatus according to claim 1, wherein the printing head includes a plurality of nozzle rows in each of which the plurality of nozzles are arranged and that are configured to eject inks having colors different from one another, and the control unit causes the test pattern including a plurality of patterns formed by the plurality of nozzle rows to be printed, receives selection linked to a color of an ink that is selection of the test pattern image, and causes the cleaning unit to execute cleaning corresponding to the test pattern image related to the selection on the nozzle row configured to eject the ink having the color linked to the selection.

4. The printing apparatus according to claim 1, wherein the control unit receives selection linked to a region of the printing head that is selection of the test pattern image, and causes the cleaning unit to execute cleaning corresponding to the test pattern image related to the selection on the region linked to the selection.

5. The printing apparatus according to claim 1, wherein the control unit causes the printing head to reprint the test pattern after cleaning by the cleaning unit is executed, causes the display unit to also display autonomous determination as one of options when causing the display unit to display the test pattern image in response to receiving an instruction for executing cleaning again through the operation reception unit, acquires read data by a scanner of the reprinted test pattern when receiving selection of the autonomous determination through the operation reception unit, determines a printing defectiveness degree based on the read data, and determines a type of the cleaning to be executed according to the defectiveness degree, and causes the cleaning unit to execute the determined type of cleaning.

6. A method for controlling a printing apparatus configured to perform printing by using a printing head including a plurality of nozzles configured to eject an ink, the method comprising:

a test pattern printing step of causing the printing head to eject an ink from the plurality of nozzles to a medium, thereby printing a test pattern;

a test pattern image display step of displaying on a display unit a plurality of test pattern images as a plurality of cleaning options from low cleaning intensity to high cleaning intensity, the plurality of test pattern images obtained by simulating a printing result of the test pattern and whose printing defectiveness degrees are different;

a selection reception step of receiving selection of one of the plurality of test pattern images from outside; and a cleaning step of executing, on the printing head, cleaning corresponding to the selected test pattern image among a plurality of types of cleaning associated with the plurality of test pattern images in advance, which is cleaning of the printing head, an ink ejection step of ejecting an ink from the plurality of nozzles to a medium before printing the test pattern, thereby causing the printing head to print a pre-test pattern, an acquiring step of acquiring read data by a scanner of the printed pre-test pattern, a determining step of determining a printing defectiveness degree based on the read data, and determines a type of the cleaning to be executed according to the defectiveness degree, a second cleaning step of executing cleaning corresponding to the determined type of cleaning, and then causing the printing head to print the test pattern, and a displaying step of causing the display unit to display the plurality of test pattern images in response to receiving an instruction for executing cleaning again through an operation reception unit.

* * * * *